US009548920B2

(12) United States Patent
Narasimha et al.

(10) Patent No.: US 9,548,920 B2
(45) Date of Patent: Jan. 17, 2017

(54) SYSTEM AND METHOD FOR EFFICIENT USE OF FLOW TABLE SPACE IN A NETWORK ENVIRONMENT

(71) Applicant: CISCO TECHNOLOGY, INC., San Jose, CA (US)

(72) Inventors: Maithili Narasimha, Sunnyvale, CA (US); Ashwin Deepak Swaminathan, San Jose, CA (US); Naga Venkata Kiran K. Chunduri, Cupertino, CA (US); Srinivas Sardar, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 497 days.

(21) Appl. No.: 13/651,597

(22) Filed: Oct. 15, 2012

(65) Prior Publication Data

US 2014/0108632 A1  Apr. 17, 2014

(51) Int. Cl.
*G06F 15/173* (2006.01)
*H04L 12/721* (2013.01)
*H04W 40/24* (2009.01)
*H04L 12/741* (2013.01)

(52) U.S. Cl.
CPC .............. *H04L 45/38* (2013.01); *H04L 45/54* (2013.01); *H04W 40/242* (2013.01)

(58) Field of Classification Search
CPC ........ H04L 45/38; H04L 45/54; H04W 40/242
USPC ....................................................... 709/223
See application file for complete search history.

(56) References Cited

U.S. PATENT DOCUMENTS

| | | | | |
|---|---|---|---|---|
| 6,466,985 B1 * | 10/2002 | Goyal | ..................... | H04L 45/00 370/236 |
| 7,177,311 B1 * | 2/2007 | Hussain | .................. | H04L 45/00 370/392 |
| 7,817,549 B1 * | 10/2010 | Kasralikar . | .......... | H04L 43/026 370/232 |

(Continued)

FOREIGN PATENT DOCUMENTS

WO  WO2014/062365  4/2014

OTHER PUBLICATIONS

PCT Nov. 28, 2013 International Search Report and Written Opinion of the International Searching Authority from International Application No. PCT/US2013/062496.

(Continued)

*Primary Examiner* — Brian J Gillis
*Assistant Examiner* — Steve Lin
(74) *Attorney, Agent, or Firm* — Patent Capital Group

(57) ABSTRACT

A method is provided in one example embodiment and includes determining an action to be performed with respect to a packet corresponding to a new flow received at a network device and determining whether a new entry comprising an indication of the determined action can be added to a flow table of the network device. The determination of whether a new entry can be added to the flow table is made with reference to reservation information specified in a port profile associated with the new flow. Responsive to a determination that the new entry can be added, the new entry is added to the flow table. In one embodiment, determining whether the new entry can be added comprises determining whether an existing entry can be aged out based on the reservation information specified in the associated port profile.

17 Claims, 4 Drawing Sheets

(56) References Cited

U.S. PATENT DOCUMENTS

| | | | |
|---|---|---|---|
| 8,169,910 B1* | 5/2012 | Kohn et al. | 370/235 |
| 8,417,800 B2* | 4/2013 | Shah et al. | 709/220 |
| 8,615,579 B1* | 12/2013 | Vincent | G06F 9/4856 |
| | | | 709/223 |
| 9,244,843 B1* | 1/2016 | Michels | G06F 12/0817 |
| 2008/0192752 A1* | 8/2008 | Hyslop | H04W 74/06 |
| | | | 370/395.21 |
| 2011/0255538 A1 | 10/2011 | Srinivasan | |
| 2011/0261828 A1 | 10/2011 | Smith | |
| 2011/0310894 A1 | 12/2011 | Karino | |
| 2011/0320632 A1* | 12/2011 | Karino | 709/238 |
| 2012/0131662 A1 | 5/2012 | Kuik et al. | |
| 2012/0158938 A1 | 6/2012 | Shimonishi et al. | |
| 2012/0263186 A1* | 10/2012 | Ueno | 370/401 |
| 2012/0281698 A1* | 11/2012 | Forster et al. | 370/392 |
| 2013/0034021 A1* | 2/2013 | Jaiswal et al. | 370/255 |
| 2013/0061225 A1* | 3/2013 | Nakagawa | 718/1 |
| 2013/0208621 A1* | 8/2013 | Manghirmalani | H04L 45/44 |
| | | | 370/254 |
| 2013/0230047 A1* | 9/2013 | Subrahmaniam et al. | 370/392 |
| 2014/0098669 A1* | 4/2014 | Garg et al. | 370/235 |

OTHER PUBLICATIONS

"Cisco Nexus 1000V Series Switches: Deploy Cisco vPath Service-Chaining Architecture," White Paper, Aug. 1, 2012, pp. 1-4. www.cisco.com/en/US/prod/collateral/switches/ps9441/ps9902/white_paper_c11-13736.pdf.

PCT Apr. 21, 2015 International Preliminary Report on Patentability from International Application No. PCT2013/062496.

* cited by examiner

| INITIAL FLOW TABLE USAGE |||| 
|---|---|---|---|
| PORT GROUP | PRIORITY | NUMBER OF INSTANTIATIONS | FLOW TABLE USAGE (%) |
| A | 1 | 2 | 45 |
| B | 3 | 3 | 40 |
| C | 6 | 4 | 10 |

FIG. 4

| FLOW TABLE USAGE AFTER ADDITION OF NEW VM ||||
|---|---|---|---|
| PORT GROUP | PRIORITY | NUMBER OF INSTANTIATIONS | FLOW TABLE USAGE (%) |
| A | 1 | 2 | 45 |
| D | 2 | 1 | 20 |
| B | 3 | 3 | 28 |
| C | 6 | 4 | 7 |

FIG. 5

| FLOW TABLE USAGE AFTER REMOVAL OF EXISTING VM ||||
|---|---|---|---|
| PORT GROUP | PRIORITY | NUMBER OF INSTANTIATIONS | FLOW TABLE USAGE (%) |
| A | 1 | 1 | 35 |
| D | 2 | 1 | 25 |
| B | 3 | 3 | 32 |
| C | 6 | 4 | 8 |

FIG. 6

SYSTEM AND METHOD FOR EFFICIENT USE OF FLOW TABLE SPACE IN A NETWORK ENVIRONMENT

TECHNICAL FIELD

This disclosure relates in general to the field of digital communications and, more particularly, to efficient use of flow table space in a network environment.

BACKGROUND

Historically, packet-based processing has been implemented by applying one of two models, including a packet-based datapath model and a flow-based datapath model. In a flow-based datapath model, data that is searched, retrieved, or calculated during processing of the first packet of the flow is cached for reuse during processing of subsequent packets of the same flow. A flow table is built and maintained at each host and each flow table entry corresponds to and includes essential identifying and switching information concerning the flow. Entries are added to the flow table either during the processing of the first packet of the flow appearing at the flow-based datapath or in response to a control plane command issued prior to the first packet being encountered. When a packet is received at a node, if the packet is associated with a flow table entry, the entry is retrieved from memory and used to grant the packet the required services with minimal additional memory access.

In a flow-based datapath model, such as OpenFlow, for example, the flow table in the datapath, or fast path, is programmed as a result of the action taken for the same flow in the slow path. For example, in a digital virtual switch ("DVS"), such as Nexus 1000V, available from Cisco Systems, Inc., of San Jose, Calif., a packet is sent to the slow path for further processing if there is a "flow miss" (i.e., there is no flow table entry for the flow) in the fast path. Once the packet is processed by the slow path, a corresponding flow is programmed in the fast path with the switching decision by adding an entry to the flow table. Entries remain in the flow table until they are removed, or "aged out," for one of a variety of reasons. Understandably, using this model, flow table space, or "flow space," is a critical resource. If the space is not used efficiently, the result will be increased look-up times or packets being relegated to the slow path.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 4-6 are tables illustrating relative flow table usage on a per port group basis in accordance with an embodiment of the present disclosure.

DETAILED DESCRIPTION OF EXAMPLE EMBODIMENTS

Overview

A method is provided in one example embodiment and includes determining an action to be performed with respect to a packet corresponding to a new flow received at a network device and determining whether a new entry comprising an indication of the determined action can be added to a flow table of the network device. The term 'determine' in these contexts is meant to broadly encompass any activity associated with evaluating, examining, analyzing, or otherwise processing information to reach a result. The determination of whether a new entry can be added to the flow table is made with reference to reservation information specified in a port profile associated with the new flow. Responsive to a determination that the new entry can be added, the new entry is added to the flow table. In one embodiment, determining whether the new entry can be added comprises determining whether an existing entry can be aged out based on the reservation information specified in the associated port profile.

The reservation information may comprise a number of flow table entries reserved for virtual machines ("VMs") associated with the port profile instantiated on the network device, a percentage of total flow table space reserved for VMs associated with the port profile instantiated on the network device, or a weighted priority assigned to VMs associated with the port profile instantiated on the network device. The determining whether the new entry can be added may include evaluating whether an existing flow table entry should be removed from the flow table based on the weighted priority assigned to a VM with which the new flow is associated relative to a weighted priority assigned to other VMs instantiated on the network device. In one embodiment, the network device comprises a virtual Ethernet module and the port profile is maintained on a supervisory module connected to the network device.

Example Embodiments

Figure 1:
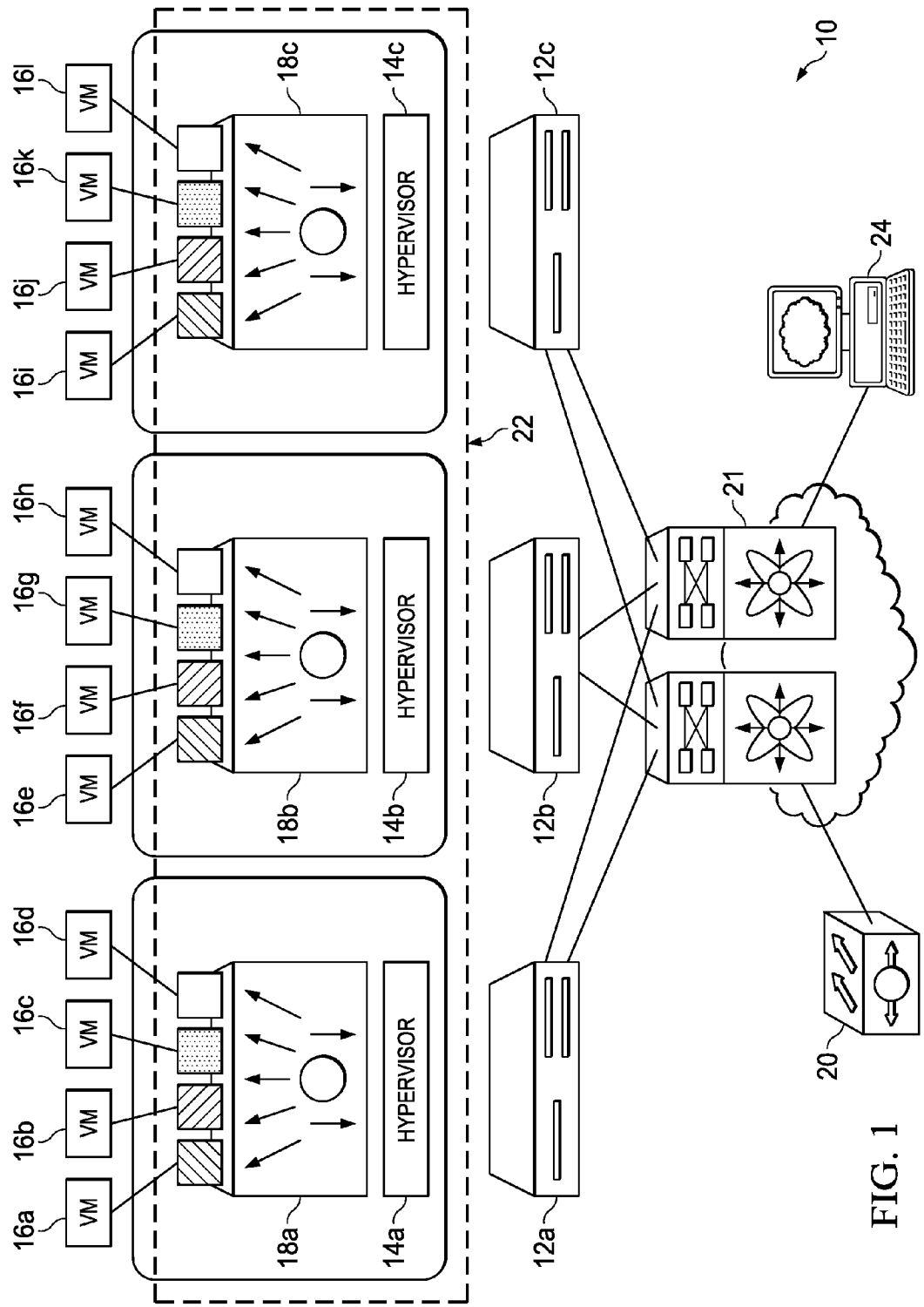
FIG. 1 is a simplified block diagram of a communication system for implementing embodiments of a port profile based flow space reservation scheme in accordance with the present disclosure.

Turning to FIG. 1, FIG. 1 is a simplified block diagram of a communication system 10 for implementing embodiments of a port profile based flow space reservation scheme described herein. In one embodiment, system 10 may employ virtualization to expand computing resources available to users. As will be recognized, virtualization is the creation of a virtual, rather than an actual, version of computing resources, such as a hardware, an operating system, storage device, or other network resources. As illustrated in FIG. 1, system 10 includes a plurality of servers, represented in FIG. 1 by servers 12a-12c.

In the illustrated embodiment, each of servers 12a-12c functions as a host server and as such comprises a virtual machine manager ("VMM"), or a hypervisor, 14a-14c comprising software for managing a plurality of virtual machines ("VMs") 16a-16l, hosted by the respective server. In general, a VM may be defined as a completely isolated guest operating system installation within a host operating system. VMs may be implemented using hardware virtualization, software emulation, or both. A VM is a software implementation of a computer that executes programs as if it were a separate physical computer. VMs may be classified into one of two types, based primarily on their use as well as their degree of correspondence to a physical computer. A "system VM" provides a complete system platform that supports execution of a complete OS, whereas a "process VM" is designed to run a particular application program and as such supports a single process. It will be recognized that the software running inside a VM is limited to the resources and abstractions provided by and allotted to the VM; in other words, a VM is limited to its virtual environment. In certain embodiments, VMs may be configured to run web applications, human resources ("HR") applications, database applications, or DMZs, to name just a few.

In one embodiment, the hypervisors 14a-14c may be implemented using VMware vSphere, which is an enhanced suite of virtualization tools with cloud computing utilizing VMware ESX/ESXi. Additionally, each of the servers 12a-12c may comprise a virtual machine access switch virtual Ethernet module ("VEM") 18a-18c. In the embodiment illustrated in FIG. 1, each of the VEMs 18a-18c is implemented as a Cisco Nexus 1000V series switch VEM that runs in association with the respective hypervisor 14a-14c.

In the illustrated exemplary embodiment, each VEM 18a-18c runs as a part of the kernel of its respective hypervisor 14a-14c and uses the VMware Vnetwork Distributed Switch ("vDS") API to ensure that the VEM is fully aware of server virtualization events. The VEMs receive configuration and certain control information from a Virtual Supervisory Module ("VSM") 20 via a switch network 21 and perform Layer 2 switching and advanced networking functions including PortChannels, Quality of Service ("QoS"), security (including private VLAN, access control lists ("ACLs") and port security), and monitoring (including NetFlow, Switch Port Analyzer ("SPAN") and Encapsulated Remote SPAN ("ERSPAN")). In the event that communication with the VSM 20 is lost, each VEM 18a-18c has the ability to continue to switch traffic based on the last known configuration.

In one embodiment, the VSM 20 is implemented as a Cisco Nexus 1000V series VSM and as such, is capable of controlling multiple VEMs, such as the VEMs 18a-18c, as one logical modular switch 22. In one embodiment, a single VSM can run and manage a maximum of 64 host servers with 2048 virtual Ethernet ports per distributed switch (with a maximum of 256 ports per host). In total, 2048 active VLANs and 2048 port profiles (described below) may be configured on a single VSM. A host may have up to 32 physical NICs and 8 port-channels (with 256 port-channels per distributed switch).

Switch configuration is performed through the VSM 20 and is automatically propagated to the VEMs 18a-18c. Instead of configuring soft switches inside each hypervisor on a host-by-host basis, administrators can define configurations for immediate use on VEMs being managed by the VSM from a single graphical user interface at the VSM. In accordance with features of one embodiment, the VSM 20 also communicates with a server 24 comprising a centralized management tool for managing the hypervisors 14a-14c and VMs 16a-16l through a single console application via VDS API. In one embodiment, the management server 24 is implemented as a VMware vCenter server and communicates with the hypervisors 14a-14c via the switch network 21.

As will be described in greater detail below, in system 10, port profiles are used to address the dynamic nature of server virtualization from the network prospective. Port profiles enable definition of VM network policies for different types, or classes, of VMs from the VSM 20 and subsequent application of the profiles to the individual VM vNICs through a GUI on the management server 24. This feature enables transparent provisioning of network resources. Port profiles are a scalable mechanism for configuring networks with a large number of virtual machines and contain the properties and settings used to configure the virtual ports on the VEMs 18a-18c.

Figure 2:
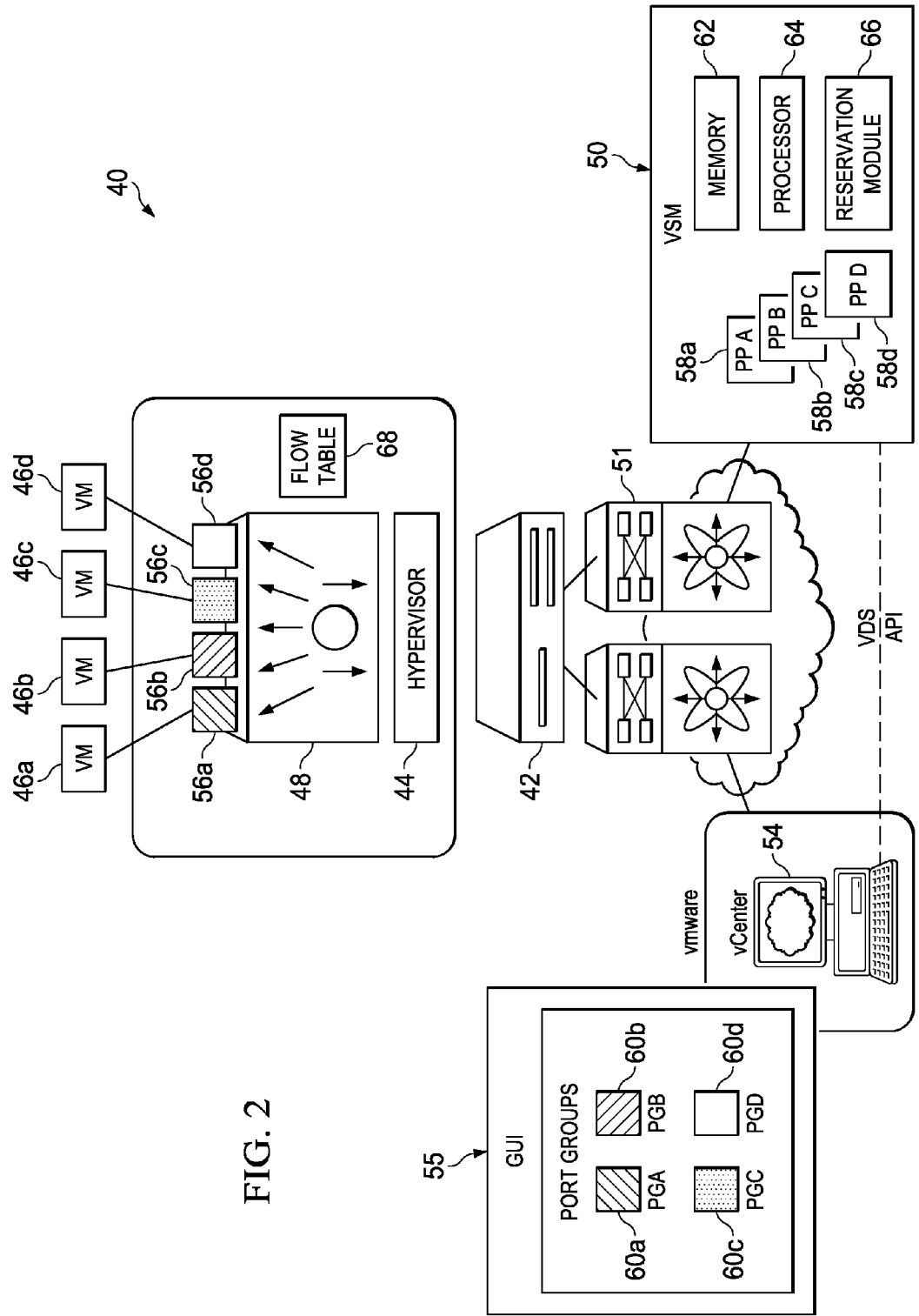
FIG. 2 is a more detailed block diagram of a communication system similar to the communication system for implementing embodiments of a port profile based flow space reservation scheme in accordance with the present disclosure.

FIG. 2 is a more detailed block diagram of a communication system 40 for implementing embodiments of a port profile based flow space reservation scheme described herein. As with system 10 shown in FIG. 1, system 40 employs virtualization to expand computing resources available to users. For purposes of simplicity of illustration and discussion, system 40 is shown as including a single server 42. As with the servers 12a-12c of FIG. 1, the server 42 functions as a host server and as such comprises a VMM, or a hypervisor, 44 comprising software for managing a plurality of VMs 46a-46d, hosted by the server.

As described above, the hypervisor 44 may be implemented using VMware vSphere and the server 42 may comprise a VEM 48 implemented as a Cisco Nexus 1000V series switch VEM that runs in association with the hypervisor 44. The server 42, hypervisor 44, and VEM 48 may be identical in relevant respects to the servers 12a-12c, hypervisors 14a-14c, and VEMs 48a-48c, respectively, illustrated in FIG. 1.

In the embodiment illustrated in FIG. 2, the VEM 48 runs as a part of the kernel of the hypervisor 44 and uses the vDS API to ensure that the VEM is fully aware of server virtualization events. The VEM 48 receives configuration and certain control information from a VSM 50 via a switch network 51 and performs Layer 2 switching and advanced networking functions as described above with respect to the VEMs 18a-18vc.

As previously noted, switch configuration is performed using the VSM 50 and is propagated to the VEM 48. Configurations may be defined for immediate use on switches managed by the VSM 50 via a single user interface; additionally, the VSM communicates with a management server 54 that manages the hypervisor 44 and VMs 46a-46d through a single console application via VDS API. In one embodiment, the management server 54 may be implemented as a VMware vCenter server and may communicate with the hypervisor 44 via the switch network 51.

In system 40, port profiles are used to address the dynamic nature of server virtualization from the network prospective. Port profiles enable definition of VM network policies for different types, or classes, of VMs (referred to as "port groups") from the VSM 50 and subsequent application of the profiles to the individual VM vNICs through a GUI 55 on the management server 54. This feature enables transparent provisioning of network resources. Port profiles are a scalable mechanism for configuring networks with a large number of virtual machines and contain the properties and setting used to configure virtual ports on the VEM 48, represented in FIG. 2 by virtual ports 56a-56d.

Network and security policies defined in its port profile follow a VM throughout its lifecycle, whether it is migrated from one server to another, suspended, hibernated, or restarted. In addition to migrating the policy, the VSM moves the VMs network state, such as port counters and flow statistics. VMs participating in traffic monitoring activities can continue these activities uninterrupted. When a specific port profile is updated, live updates are automatically provided to the virtual ports that use the same port profile through the VEM(s) and VSM.

In one embodiment, inside the management server 54, VMs are configured in a conventional manner. Additionally, port profiles defined on the VSM 50, represented in FIG. 2 by port profiles A-D and designated by reference numerals 58a-58d, are displayed via the GUI 55 of the management server 54 as port groups, represented in FIG. 2 by port groups A-D and designated by reference numerals 60a-60d. As a result, virtualization administrators can take advantage of preconfigured port groups (e.g., port groups A-D on management server 54) and focus on VM management and network administrators can use port profiles to apply policy for a large number of ports at once. In accordance with features of embodiments described herein for implementing a port profile based flow space reservation scheme, and as will be described in greater detail hereinbelow, each of the port profiles 58a-58d include reservation information comprising an indication of how much flow space will be reserved for VMs instantiated on the host server and associated with the respective port profile.

For purposes that will be also described in greater detail below, the VSM 50 includes a processor 62, memory 64, and a flow space reservation module 66 for implementing a dynamic flow space reservation scheme in accordance with features of embodiments described herein. It will be recognized that portions of the logic comprising the flow space reservation module 66 may be implemented elsewhere in system 40 as necessary for carrying out the port profile based flow space reservation scheme described herein. As previously noted, flow table space limitations seriously impact packet processing in a switch. In particular, inefficient use of the flow table space of a flow table 68 of the host 42 will either slow down flow look-ups or will result in more critical packets being relegated to the slow path. Clearly, neither of these situations is desirable. In one embodiment, system and method are described for providing a port profile based flow table space reservation. As also previously noted, in the system described herein, port profiles are containers of network policy and configuration information (including flow space reservation information) for a group of virtual interfaces, or ports. The VM interfaces that are attached to a particular port profile have identical network policy applied to the traffic seen at those interfaces. Network administrators in tandem with server administrators configure the port profiles based on the VMs that will be attached to the port profile and the type of traffic that will be traversing the interfaces.

Currently, when a packet comprising is detected at a port, a determination is made whether the packet comprises a flow for which a flow table entry exists in the flow table of the host. If not, and there is room in the flow table, a corresponding entry is added; if there is no room in the flow table, an existing flow table entry may be aged out of the flow table to make room for the new flow. Aging out may be based on one of a number of different algorithms, including, for example, least recently used ("LRU"), first in first out ("FIFO"), or a combination of active and inactive timers. If a flow table entry cannot be aged out for some reason, the packet will be punted to the slow path for processing and the switch decision will be based on that processing. It should be noted that the switch decision will not be cached in this case; therefore, subsequent packets of this flow will also be punted to the slow path. Clearly, this is a very reactive methodology with no consideration given to the type of traffic or VMs that currently or can be reasonably expected to exist on the host.

In contrast, in accordance with features of one embodiment, since there is an awareness via the VEM/VSM of what types of port profiles are instantiated on each host, as well as what type of traffic is expected to traverse each host port that inherits a particular port profile, network administrators may determine that traffic traversing ports having certain port profiles have priority over traffic traversing other ports. In general, a weighted priority can be assigned to each port profile that may be instantiated on a host relative to other port profiles that may be instantiated thereon. Since the network administrator should have reasonable a priori knowledge of the traffic seen on the interfaces attached to a port profile, he or she can define reservations with respect to the flow table space. Effectively, this translates to having a per-port profile reservation configuration that can be configured statically, by specifying a number or percentage of flow table entries reserved for instantiations of the port group associated with the profile, or in a more complex manner that takes into account dynamic conditions, some of which are described below.

For example, relative critical weights could be associated with different port profiles, translating to how the reservation behavior for a particular port profile should adapt in the presence/absence of some other port profile on the same host. Furthermore, weights could be assigned based on the number of instantiations of a particular port profile on a host. In other words, a flow space reservation module implementing a reservation algorithm could take as input the port profiles that have been instantiated on a particular host, as well as the number of instantiations of each of the port profiles on the host, before arriving at a reservation scheme for flow space.

In one embodiment, the reservation of flow table space should not result in unused space. Unused space of a port profile should be used by other active profiles until the flows on the first port profile begin increasing. For example, expanding on the previous example, a network administrator may configure two different port profiles, such as one for a web server VM and another for an application server VM. In the port profile for the web server VM, he can specify a flow space reservation of 40% and in the port profile for the application server VM, he specify a flow space reservation of 60%. As a result, even when the volume of traffic to web server VMs is high, there is an assurance that flows expected on application server VMs will continue to be serviced in the fast path without incurring unnecessary delays. In a further enhancement, instead of assigning a static percentage reservation as described above, the network administrator may assign relative weights to the port groups as to how much space should be reserved for instantiations of one port group on a host as opposed to instantiations of other port groups on the same host. In accordance with features described herein, run time decisions can be made to adjust the amount of flow space reserved for each group depending on the type and number of other port groups instantiated on the host. This information may also be used as a factor in aging out existing entries when an entry for a new flow needs to be installed in the flow table.

Figure 3:
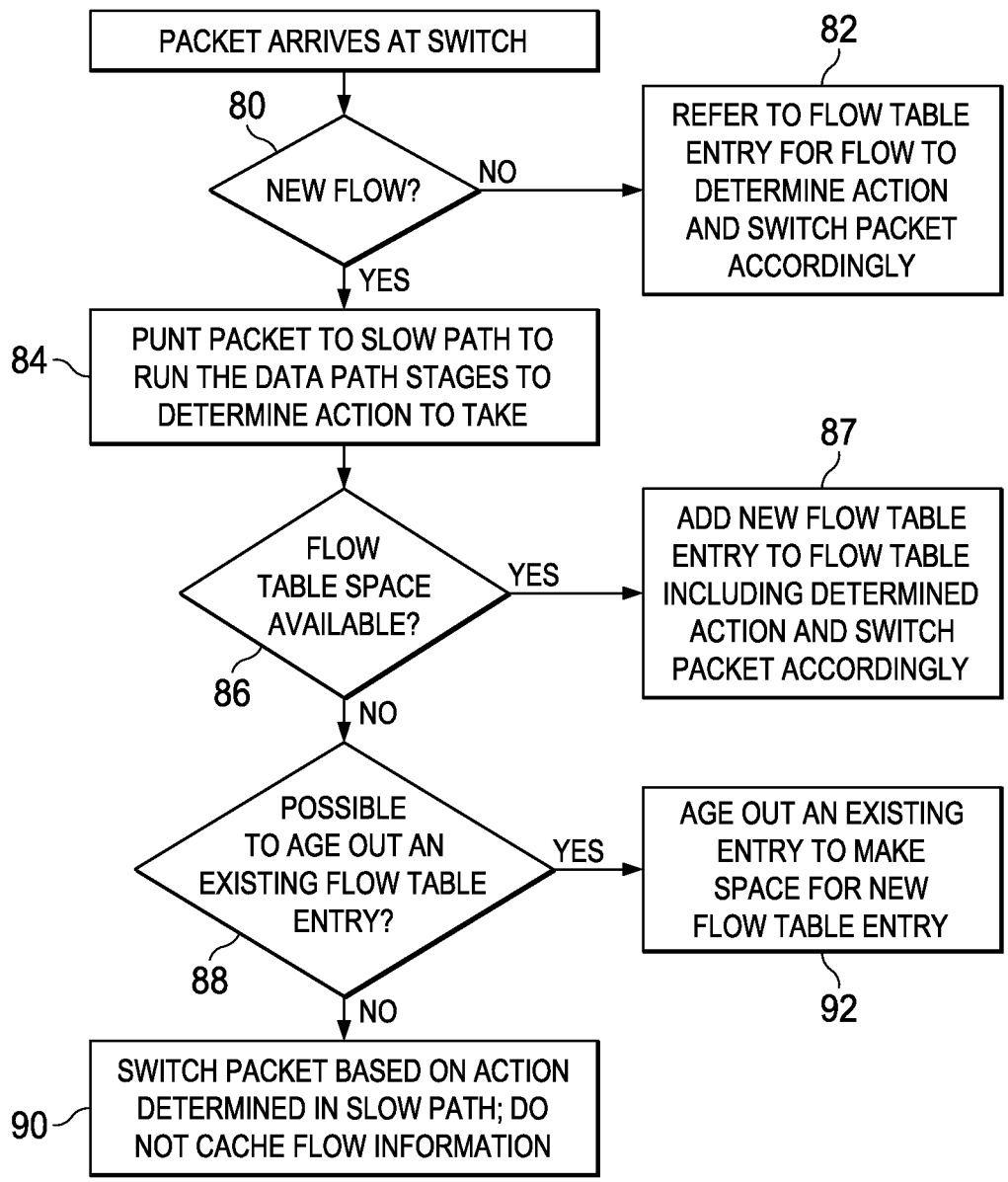
FIG. 3 is a flowchart illustrating a method of implementing a port profile based flow space reservation scheme in accordance with an embodiment of the present disclosure.

FIG. 3 is a flowchart illustrating operation of a port profile based reservation scheme of one embodiment. It will be recognized that, prior to initiation of the process illustrated in FIG. 3, port profiles have been defined using the VSM and made available to the management server, which provisions VMs in accordance with the defined profiles. Each of these port profiles includes reservation information in accordance with embodiments described herein. Referring to FIG. 3, upon receipt at a switch, such as a VEM, of a data packet associated with a flow, a determination may be made in step 80 whether the flow with which the packet is associated is a new flow. This step may be implemented in the fast path and may involve an examination of packet header information, such as source IP address, source MAC address, destination IP address, destination MAC address, and protocol type, to determine whether the packet header information matches an entry in the flow table associated with the VEM. If an entry for the flow is found in the flow table, then the packet is not part of a new flow and the packet is processed in accordance with the flow table entry discovered in step 82. In particular, in step 82, the appropriate action with respect to the packet is determined from the flow table entry and the packet is switched accordingly. If it is determined that the packet is associated with a new flow (e.g., if an entry is not found in the flow table), execution proceeds to step 84. In step 84, the packet is punted to the slow path and the data path stages are run to arrive at a switching decision regarding an action to be taken with respect to the packet.

Next, in step 86, a determination is made whether there is space available in the flow table to add an entry for the new flow. If it is determined that flow space is available, in step 87, an entry corresponding to the new flow, which entry includes the action determined in step 84, is added to the flow table and the packet is switched accordingly. Alternatively, if a determination is made in step 86 that flow space is not available, in step 88, a determination is made whether it is possible to "age out" one of the existing entries in accordance with embodiments described herein.

In particular, in accordance with features of an example embodiment, the determination made in step 88 is made in association with the reservation module 66 (FIG. 2) in accordance with reservation information included in the port profile associated with the flow. As mentioned above, the reservation information in the port profile may simply designate a maximum number of flow table entries reserved for flows associated with VM instantiations of the port group defined by the profile, in which case, the reservation module merely determines whether that maximum number has already been met. In other words, the reservation module determines whether the total number of flow entries associated with instantiations of the particular port group is equal to the maximum number specified in the corresponding port profile. If so, a negative determination is made in step 88; otherwise, a positive determination is made.

In an alternative example embodiment, instead of specifying the flow space reservation as a maximum number, the reservation information in the port profile may express the flow space reservation as a percentage, wherein the specified percentage of the flow table is reserved for entries associated with instantiations of the corresponding port group. In this situation, the reservation module determines whether the percentage of flow entries associated with instantiations of the particular port group is equal to the percentage specified in the corresponding port profile. If so, a negative determination is made in step 88; otherwise, a positive determination is made.

In another example alternative embodiment, the reservation information in the port profile may indicate a priority associated with the particular port group. For example, traffic associated with VMs of a particular port group type may be considered to be more critical than that associated with VMs of another port group type and therefore be "entitled" to more flow table space. In cases such as this, a relative priority is assigned to a port group in its associated port profile. For example, assume the port profile of a first port group indicates a higher relative priority than a port profile of a second port group. Assuming only VMs of the second port group are instantiated on a server, the entire flow table can be dedicated to entries corresponding to flows of instantiations of the second port group. However, if a VM associated with the first port group is subsequently instantiated on the server, because the port profile associated with the first port group indicates a higher relative priority than the port profile associated with the second port group, one or more flow entries associated with instantiations of the second port group will be dropped from the flow table to make room for entries associated with flows of the instantiation(s) of the first port group on the server. Clearly, therefore, in this scenario, the algorithm implemented in step 88 to reach a decision as to whether there is flow space available for the new flow is more complex, robust, and flexible and dependent not only on the number of instantiations on the server of the same port group, but also the number and identities of instantiations of other port groups on the server at that time. This embodiment takes advantage of the information available to the VSM, both directly and via the management server, concerning the traffic on the VEM.

This concept is illustrated more clearly in FIGS. 4-6. Referring first to FIG. 4, illustrated therein is a table showing relative flow table usage on a per port group basis. In one embodiment, the VSM will maintain a representation of a relative flow usage table, such as the one illustrated in FIG. 4, for each host server it supervises. As shown in FIG. 4, a server is hosting VMs of three port groups, port group A, the port profile of which indicates it has a relative priority of 1 (which is the highest priority), port group B, the port profile of which indicates it has a relative priority of 3, and port group C, the port profile of which indicates it has a relative priority of 6 (which is the lowest priority of the port groups listed). At some point in time, there are 2 instantiations on the server of VMs of port group A, 3 instantiations on the server of VMs of port group B, and 4 instantiations on the server of VMs of port group C. In accordance with the relative priorities of the port groups, the total amount of flow space reserved for VMs of port group A is 45%, the total amount of flow space reserved for VMs of port group B is 40%, and the total amount of flow space reserved for VMs of port group C is 15%. It will be recognized that the flow space usage per port group is based on the priority of the port group type, the number of instantiations of VMs of that port group relative to the priority(ies) and number of instantiations of VMs of other port groups on the server. It will further be recognized that the numbers shown in FIG. 4 are for illustrative purposes only.

Referring now to FIG. 5, it will be assumed that at some later point in time, one VM of another port group type, port group D, the port profile of which indicates it has a relative priority of 2, is instantiated on the server. FIG. 5 illustrates an example shift in the relative flow usage resulting from this addition. For example, in the illustrated example, port group A VMs may remain at 45% flow usage, due to the fact that port group A has a higher priority than port group D and there are other lower priority port groups (i.e., port group B and port group C) whose flow usage may be reduced first to make room for the instantiation of the port group D VM. Port group D now enjoys the second highest priority of the port groups instantiated on the server, and as such, its one instantiation is allocated 20% of the flow table space. Instantiations of port group B VMs, which have the third highest priority, have their flow table space reduced to 28%. Finally, instantiations of the lowest priority port group, port group C, VMs have their flow table space reduced to 7%.

Referring next to FIG. 6, it will be assumed that at some point in time after the addition of the port group D instantiation shown in FIG. 5, one VM of port group A is removed from the server for one reason or another. FIG. 6 illustrates an example shift in the relative flow usage resulting from this deletion. For example, in the illustrated example, the flow usage of port group A VMs (of which there is now only one) may drop to 35%, due to the fact that port group A still has the highest priority. The flow usage of instantiations of port group D, which has the second highest priority, is increased the most, from 20% to 25%, in response to the change. The flow usage of instantiations of port group B, which has the third highest priority of the groups, is increased somewhat, from 28% before the change to 32% after the change. Finally, the flow usage of instantiations of port group C, which is the largest group but which has by far the lowest priority, is increased minimally, from 7% before the change to 8% after the change.

Referring again to FIG. 3, if a determination is made in step 88 that it is not possible to age out an existing flow table entry, in step 90, the packet will be switched based on the action decided on during the process performed in the slow path processing (step 84). In this case, flow information regarding the action will not be cached into the flow table; as a result, the next packet of the flow will be punted to the slow path in step 84. This will continue for packets of the flow until no more packets of the flow arrive at the switch or until flow space is or can be made available, due to aging out of the flow table of other flow table entries or a relative shift in the instantiations at the switch that causes the flow to be of a high enough relative priority to be justify aging out another flow table entry. If it is determined in step 88 that it is possible to age out an existing entry, in step 92, the entry is aged out and a flow table entry corresponding to the new flow is added to the flow table.

As will be readily recognized, the embodiments described herein provide a fair and weighted representation in the flow table for VM traffic at a host. Moreover, the embodiments provide a more fine-grained control to reserve flow space. Additionally, it provides a means by which network administrators can better balance service of more critical flows with that of more frequent ones, such that frequent flows do not necessarily claim the most flow space as might otherwise be the case. Still further, if a particular port profile is not instantiated by any VMs on a host or is not being used to capacity, the flow table space that might otherwise be allocated to that port profile using static schemes, such as numerical or percentage based reservation, can be assigned dynamically to other VMs on the host to ensure full utilization of flow table space; previous reservation schemes do not ensure this result.

In a data center environment, the flow monitoring in an access switch, such as the VEM, will be more important as it sees the VM traffic devoid of any L2/L3 switch encapsulation. Currently in Nexus 1000V, the flows are monitored "per feature." For example, ACL-feature monitors permit or deny IPv4 flows for logging purposes. Likewise, ARP logging monitors ARP traffic that was permitted or denied on the network and so on. The port profile-based scheme described hereinabove with respect to reservation of flow table space could be used to implement port profile based rate limiting so that more critical flows could be monitored for those characteristics as well.

It should be noted that much of the infrastructure discussed herein (e.g., VSMs 20, 50, VEMs, VMs, etc.) can be provisioned as part of any type of network device. As used herein, the term "network device" can encompass computers, network appliances, hosts, routers, switches, gateways, bridges, virtual equipment, load-balancers, firewalls, processors, modules, or any other suitable device, component, element, or object operable to exchange information in a network environment. Moreover, the network devices may include any suitable hardware, software, components, modules, interfaces, or objects that facilitate the operations thereof. This may be inclusive of appropriate algorithms and communication protocols that allow for the effective exchange of data or information.

Although the embodiments described herein were illustrated with reference to a Nexus 1000V switch, the same technique could be used on any type of switch, virtual or otherwise, including Cisco Nexus and UCS switches, that support profiles for configuring ports and monitoring applications executing on those ports.

Note that in certain example implementations, the port profile based flow space reservation functions outlined herein may be implemented by logic encoded in one or more tangible, non-transitory media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element, as shown in FIG. 2, can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor, as shown in FIG. 2, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

In one example implementation, VSM 50 includes software in order to achieve the port profile based flow space reservation functionality outlined herein. This functionality may be facilitated by reservation module 66. As shown in FIG. 2, VSM 50 can include memory elements for storing information to be used in achieving port profile based flow space reservation functionality as outlined herein. Additionally, VSM 50 may include a processor that can execute software or an algorithm to perform the port profile based flow space reservation activities as discussed in this Specification. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network devices can also include suitable interfaces for receiving, transmitting, and/or otherwise communicating data or information in a network environment. Additionally, portions of the software for achieving the port profile based flow space reservation functionality may be stored and executed elsewhere in system 40.

Note that with the example provided above, as well as numerous other examples provided herein, interaction may be described in terms of two, three, or four network devices. However, this has been done for purposes of clarity and example only. In certain cases, it may be easier to describe one or more of the functionalities of a given set of flows by only referencing a limited number of network devices. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the preceding flow diagrams illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

It should also be recognized that the scenarios presented in FIGS. 4-6 are to be viewed only as examples for illustrating operation of the embodiments described herein and should not be viewed as comprising actual implementation results. In a separate endeavor, communication system 10 can generally be configured or arranged to represent the other virtual and non-virtual architectures and access switches, as well as any other types of switches that support use of port profiles for monitoring applications. Although the present disclosure has been described in detail with reference to particular arrangements and configurations, these example configurations and arrangements may be changed significantly without departing from the scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   determining that a packet received at a network device corresponds to a new flow associated with a first virtual machine ("VM");
   punting the received packet to a slow path to determine an action to be performed with respect to the packet;
   determining whether space is available in a flow table of the network device to add a new entry identifying the new flow and comprising an indication of the determined action, wherein the determining whether space is available is accomplished with reference to reservation information specified in a port profile defining a port group comprising a group of VMs instantiated on the network device, wherein the first VM is a member of the group of VMs; and
   subsequent to a determination that space is available, adding the new entry to the flow table;
   subsequent to a determination that space is not available, determining whether it is possible to age out an existing entry in the flow table;
   subsequent to a determination that it is possible to age out an existing entry in the flow table, aging out the existing entry and adding the new entry to the flow table; and
   subsequent to a determination that it is not possible to age out an existing entry in the flow table, switching the received packet based on an action determined in the slow path and refraining from caching flow information;
   wherein the reservation information indicates an amount of flow space in the flow table exclusively reserved for entries associated with the group of VMs comprising the port group.

2. The method of claim 1, wherein the reservation information specifies a maximum number of flow table entries reserved for the group of VMs comprising the port group.

3. The method of claim 1, wherein the reservation information specifies a maximum percentage of total flow table space reserved for the group of VMs comprising the port group.

4. The method of claim 1, wherein the reservation information specifies a weighted priority assigned to the group of VMs comprising the port group.

5. The method of claim 4, wherein the determining whether space is available further comprises evaluating whether an existing flow table entry should be removed from the flow table based on the weighted priority assigned to the group of VMs comprising the port group relative to a weighted priority assigned to other VMs instantiated on the network device.

6. Logic encoded in one or more non-transitory tangible media that includes code for execution and when executed by a processor is operable to perform operations comprising:
   determining that a packet received at a network device corresponds to a new flow associated with a first virtual machine ("VM");
   punting the received packet to a slow path to determine an action to be performed with respect to the packet;
   determining whether space is available in a flow table of the network device to add a new entry identifying the new flow and comprising an indication of the determined action, wherein the determining whether space is available is accomplished with reference to reservation information specified in a port profile defining a port group comprising a group of VMs instantiated on the network device, wherein the first VM is a member of the group of VMs; and subsequent to a determination that space is available, adding the new entry to the flow table;

subsequent to a determination that space is not available, determining whether it is possible to age out an existing entry in the flow table;

subsequent to a determination that it is possible to age out an existing entry in the flow table, aging out the existing entry and adding the new entry to the flow table; and subsequent to a determination that it is not possible to age out an existing entry in the flow table, switching the received packet based on an action determined in the slow path and refraining from caching flow information;

wherein the reservation information indicates an amount of flow space in the flow table exclusively reserved for entries associated with the group of VMs comprising the port group.

7. The logic of claim 6, wherein the reservation information specifies a maximum a number of flow table entries reserved for the group of VMs comprising the port group.

8. The logic of claim 6, wherein the reservation information specifies a maximum a percentage of total flow table space reserved for the group of VMs comprising the port group.

9. The logic of claim 6, wherein the reservation information specifies a weighted priority assigned to the group of VMs comprising the port group.

10. The logic of claim 9, wherein the determining whether space is available further comprises evaluating whether an existing flow table entry should be removed from the flow table based on the weighted priority assigned to the group of VMs comprising the port group relative to a weighted priority assigned to other VMs instantiated on the network device.

11. The logic of claim 6, wherein network device comprises a virtual Ethernet module.

12. The logic of claim 6, wherein the port profile is maintained on a supervisory module connected to the network device.

13. An apparatus, comprising:
a memory element configured to store data;
a processor operable to execute instructions associated with the data; and
a reservation module, wherein the apparatus is configured to:

determine that a packet received at a network device corresponds to a new flow associated with a first virtual machine ("VM");

punt the received packet to a slow path to determine an action to be performed with respect to the packet;

determine whether space is available in a flow table of the network device to add a new entry identifying the new flow and comprising an indication of the determined action, wherein the determining whether space is available is accomplished with reference to reservation information specified in a port profile defining a port group comprising a group of VMs instantiated on the network device, wherein the first VM is a member of the group of VMs; and subsequent to a determination that space is available, add the new entry to the flow table;

subsequent to a determination that space is not available, determine whether it is possible to age out an existing entry in the flow table;

subsequent to a determination that it is possible to age out an existing entry in the flow table, age out the existing entry and adding the new entry to the flow table; and subsequent to a determination that it is not possible to age out an existing entry in the flow table, switch the received packet based on an action determined in the slow path and refraining from caching flow information;

wherein the reservation information indicates an amount of flow space in the flow table exclusively reserved for entries associated with the group of VMs comprising the port group.

14. The apparatus of claim 13, wherein the reservation information specifies a maximum a number of flow table entries reserved for the group of VMs comprising the port group.

15. The apparatus of claim 13, wherein the reservation information specifies a maximum a percentage of total flow table space reserved for the group of VMs comprising the port group.

16. The apparatus of claim 13, wherein the reservation information specifies a weighted priority assigned to virtual machines ("VMs") associated with the group of VMs comprising the port group.

17. The apparatus of claim 13, wherein the port profile is maintained on a supervisory module connected to the network device.

* * * * *